US010122176B2

United States Patent
Feng et al.

(10) Patent No.: US 10,122,176 B2
(45) Date of Patent: Nov. 6, 2018

(54) PHOTOVOLTAIC INTELLIGENT POWER SUPPLY

(71) Applicant: CRRC ZHUZHOU INSTITUTE CO., LTD., Hunan (CN)

(72) Inventors: Jianghua Feng, Hunan (CN); Fang Jian, Hunan (CN); Qiang Wu, Hunan (CN); Jijing Guo, Hunan (CN); Hengliang Wu, Hunan (CN); Honghao Zhang, Hunan (CN); Yifeng Chen, Hunan (CN); Haiyan Tang, Hunan (CN); Nan Wang, Hunan (CN); Xianggui Zhao, Hunan (CN); Zhaoyi Liu, Hunan (CN); Shaolong Li, Hunan (CN); Rong Zhang, Hunan (CN)

(73) Assignee: CRRC ZHUZHOU INSTITUTE CO., LTD., Hunan (CN)

( * ) Notice: Subject to any disclaimer, the term of this patent is extended or adjusted under 35 U.S.C. 154(b) by 0 days.

(21) Appl. No.: 15/528,515

(22) PCT Filed: Oct. 29, 2015

(86) PCT No.: PCT/CN2015/093203
§ 371 (c)(1),
(2) Date: May 21, 2017

(87) PCT Pub. No.: WO2016/078507
PCT Pub. Date: May 26, 2016

(65) Prior Publication Data
US 2017/0271878 A1    Sep. 21, 2017

(30) Foreign Application Priority Data
Nov. 21, 2014    (CN) .......................... 2014 1 0673766

(51) Int. Cl.
*H02M 3/158*    (2006.01)
*H02J 3/38*    (2006.01)
(Continued)

(52) U.S. Cl.
CPC ................ *H02J 3/385* (2013.01); *H02J 3/46* (2013.01); *H02S 40/30* (2014.12); *H02S 40/32* (2014.12);
(Continued)

(58) Field of Classification Search
CPC . H02M 2001/0003; H02M 2001/0009; H02M 2001/0012; H02M 3/156;
(Continued)

(56) References Cited

U.S. PATENT DOCUMENTS 5,861,734 A *  1/1999  Fasullo ............... H02M 1/4216
                                                    323/222
9,680,304 B2 *  6/2017  Adest ...................... H02J 3/383
(Continued)

FOREIGN PATENT DOCUMENTS

CN    102148507    8/2011
CN    102510234    6/2012
(Continued)

OTHER PUBLICATIONS

"International Search Report (Form PCT/ISA/210)", dated Jan. 29, 2016, with English translation thereof, pp. 1-4.

*Primary Examiner* — Emily P Pham
*Assistant Examiner* — Shahzeb K Ahmad
(74) *Attorney, Agent, or Firm* — JCIPRNET

(57) ABSTRACT

A photovoltaic intelligent power supply, comprising a plurality of unit modules, and a communication unit (103) and a control unit (106), wherein all the unit modules are connected to the control unit (106) and the communication unit (103); each unit module comprises an input collection
(Continued)

unit (101), a data acquisition unit (102), a boost unit (104), an arc isolation unit (105) and an anti-PID unit (107), wherein the input collection unit (101) is connected to a photovoltaic module; the data acquisition unit (102) is configured to acquire voltage and current state signals; the boost unit (104) is configured to perform interleaving chopping and operate in an MPPT mode; the arc isolation unit (105) is configured to receive instructions sent by the control unit (106) to execute opening and closing; and the anti-PID unit (107) is configured to receive instructions sent by the control unit (106) so as to generate proper DC voltages to be applied between a negative electrode of a cell panel and the ground. The photovoltaic intelligent power supply supports MPPT control, and can effectively detect an arc and start protection, can ensure normal operation of an inverter, and improve reliability of a power generation system.

5 Claims, 4 Drawing Sheets

(51) Int. Cl.
*H02S 50/00* (2014.01)
*H02S 40/30* (2014.01)
*H02S 40/36* (2014.01)
*H02S 40/32* (2014.01)
*H02S 50/10* (2014.01)
*H02J 3/46* (2006.01)

(52) U.S. Cl.
CPC .............. *H02S 40/36* (2014.12); *H02S 50/00* (2013.01); *H02S 50/10* (2014.12); *H02M 3/158* (2013.01); *Y02E 10/58* (2013.01)

(58) Field of Classification Search
CPC ...... H02M 3/157; H02M 3/158; H02M 3/285; H02M 7/42; H02M 7/48; H02M 7/515; H02M 7/521; H02M 7/538; H02M 7/66; H02M 7/757; H02M 7/77; H02M 7/5387; H02S 40/32; H02S 40/36; H02S 50/10; H02J 3/385; H02J 3/46
See application file for complete search history.

(56) References Cited

U.S. PATENT DOCUMENTS

| | | | |
|---|---|---|---|
| 2006/0098461 A1* | 5/2006 | Lee | H02M 3/33507 363/17 |
| 2012/0293021 A1 | 11/2012 | Teggatz et al. | |
| 2014/0340062 A1* | 11/2014 | Jain | H02M 3/156 323/282 |
| 2014/0373894 A1* | 12/2014 | Stratakos | H02S 50/00 136/244 |
| 2015/0131187 A1* | 5/2015 | Krein | H02S 50/00 361/67 |
| 2016/0036342 A1* | 2/2016 | Takubo | H02M 5/458 363/35 |

FOREIGN PATENT DOCUMENTS

| | | |
|---|---|---|
| CN | 102882233 | 1/2013 |
| CN | 203218893 | 9/2013 |
| CN | 103475208 | 12/2013 |
| CN | 103529899 | 1/2014 |
| CN | 203617965 | 5/2014 |
| CN | 104092440 | 10/2014 |
| CN | 104377732 | 2/2015 |
| CN | 104393833 | 3/2015 |

* cited by examiner

PHOTOVOLTAIC INTELLIGENT POWER SUPPLY

CROSS-REFERENCE TO RELATED APPLICATION

This application is a 371 of international application of PCT application serial no. PCT/CN2015/093203, filed on Oct. 29, 2015, which claims the priority benefit of China application no. 201410673766.6, filed on Nov. 21, 2014. The entirety of each of the abovementioned patent applications is hereby incorporated by reference herein and made a part of this specification.

TECHNICAL FIELD

The present invention relates to the technical field of photovoltaic power generation, and particularly, to a photovoltaic intelligent power supply applicable to a photovoltaic power generation system.

BACKGROUND OF RELATED ART

In normal operating condition, U-I and P-I characteristic curves of a photovoltaic cell may vary with irradiation and temperature and present typical nonlinear characteristics. Because of low voltage and current output by a single photovoltaic module, a plurality of photovoltaic modules are usually connected in series and in parallel, and electric energy is converted afterwards in engineering. In this case, numerous factors, such as cell panels being blocked by clouds or other objects and inconsistency in temperatures and arrangement orientations of modules, may lead to power mismatch of a string of photovoltaic modules. MPPT (maximum power point tracking, i.e., holding a distributed power generation system in its maximum power output state) control mode is a commonly used means to solve this problem.

Traditional way for solving MPPT within a wide input range of a photovoltaic array is using string-type inverters in which boost modules and inverter modules are included. However, such solution have the disadvantages of high costs, small power per unit, complicated wiring due to an AC output parallel structure, and poor adaptability of a multi-parallel power grid. Moreover, in the current photovoltaic plant, increasing importance has been further attached to the protection of DC arc and inhibition of PID (Potential Induced Degradation, i.e., degradation of cells caused by bias voltage between modules and the frame) effect of a photovoltaic array with the disadvantage of high costs due to the addition of corresponding individual devices that are necessary to realize these functions.

SUMMARY OF THE INVENTION

The invention is advantageous in that it provides a photovoltaic intelligent power supply that is capable of supporting MPPT control, effectively detecting arc and immediately isolating, guaranteeing normal operation of inverters and improving the reliability of a power generation system aiming at the technical problems in the prior art.

According to the present invention, the foregoing and other objects and advantages are attained by the following technical solutions.

A photovoltaic intelligent power supply, comprising several unit modules, and a communication unit and a control unit, wherein all the unit modules are connected to the control unit and the communication unit; each unit module comprises an input collection unit, a data acquisition unit, a boost unit, an arc isolation unit and an anti-PID unit, wherein the input collection unit is connected to a photovoltaic module; the data acquisition unit is configured to acquire voltage and current state signals; the boost unit is configured to perform interleaving chopping and operate in an MPPT mode; the arc isolation unit is configured to receive instructions sent by the control unit to execute opening and closing; and the anti-PID unit is configured to receive instructions sent by the control unit so as to generate proper DC voltages to be applied between the negative electrode of a cell panel and ground.

An improvement of the present invention:

The input collection unit comprises more than two input branches connected to the photovoltaic modules, and each input branch is connected in series to a fuse.

The arc isolation unit comprises a DC circuit breaker.

The anti-PID unit is constituted by a DC/DC unit or AC/DC unit, and powered by an anti-PID power source.

The boost unit comprises an input capacitor, two IGBT modules comprising backward diodes, two inductors, two major circuit diodes, an output capacitor and two bypass diodes.

When the data acquisition unit detects that an input voltage is higher than an output voltage, boost circuits in the boost unit stop working, and current flows through the bypass diodes; and when the input voltage is lower than the output voltage, the boost circuits in the boost unit work, while the bypass diodes are naturally switched off, the two boost circuits are enabled to interleaving chopping output according to MPPT control logic.

A first drive circuit is disposed between the control unit and the boost unit to directly receive instructions from the control unit and then drive boost circuits.

A second drive circuit is disposed between the control unit and the anti-PID unit to receive instructions from the control unit and then drive the anti-PID unit.

Compared with the prior art, the present invention has the following advantages:

1. The photovoltaic intelligent power supply provided in the present invention is applicable to a DC system of a photovoltaic plant and may widen the input voltage range and MPPT range of centralized inverters effectively and utilize solar energy resources more fully with the functions of DC-side arc detection and inhibition of PID effect of photovoltaic modules.

2. The photovoltaic intelligent power supply in the present invention may increase the amount of MPPT for a power generation system of concentrated inverters and widen the system's DC voltage range and MPPT range. By means of effective arc detection and isolation, normal operation of the inverters is guaranteed and the reliability of the power generation system is improved. The photovoltaic intelligent power supply in the present invention is integrated with the function of inhibition of PID effect and thus may reduce the degradation of photovoltaic cell panels, thereby improving the power generation efficiency of the photovoltaic power generation system.

DETAILED DESCRIPTION OF THE PREFERRED EMBODIMENTS

The present invention will be further described in detail below in conjunction with the accompanying drawings and preferred embodiments.

Figure 1:
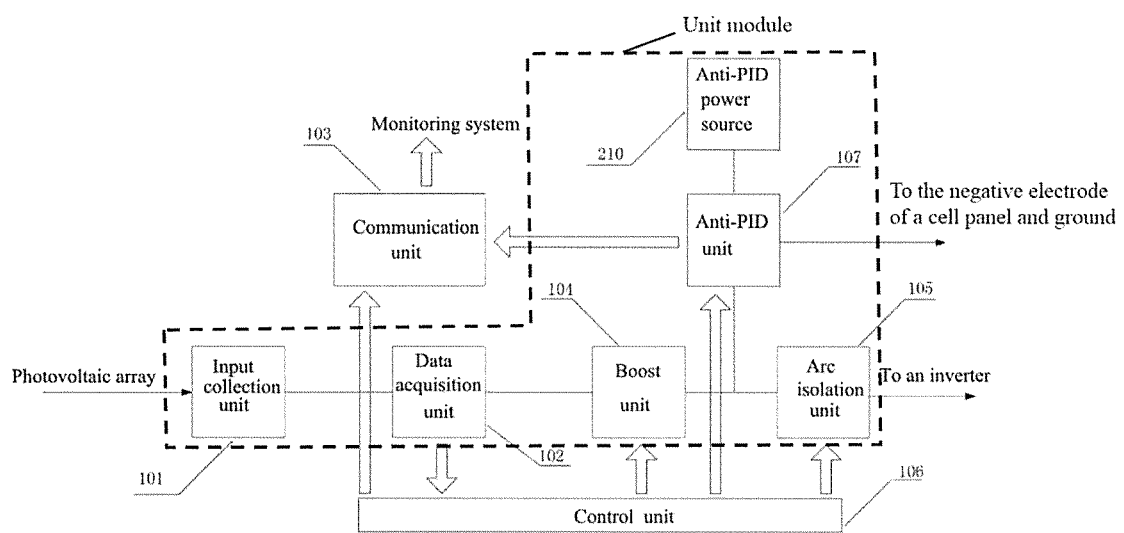
FIG. 1 is a diagram of a framework of the present invention.

As shown in FIG. 1, the photovoltaic intelligent power supply in the present invention, which is designed modularly, comprises a plurality of unit modules, and a communication unit 103 and a control unit 106. All the unit modules are connected to the control unit 106 and the communication unit 103. Each unit module comprises an input collection unit 101, a data acquisition unit 102, a boost unit 104, an arc isolation unit 105 and an anti-PID unit 107.

Figure 2:
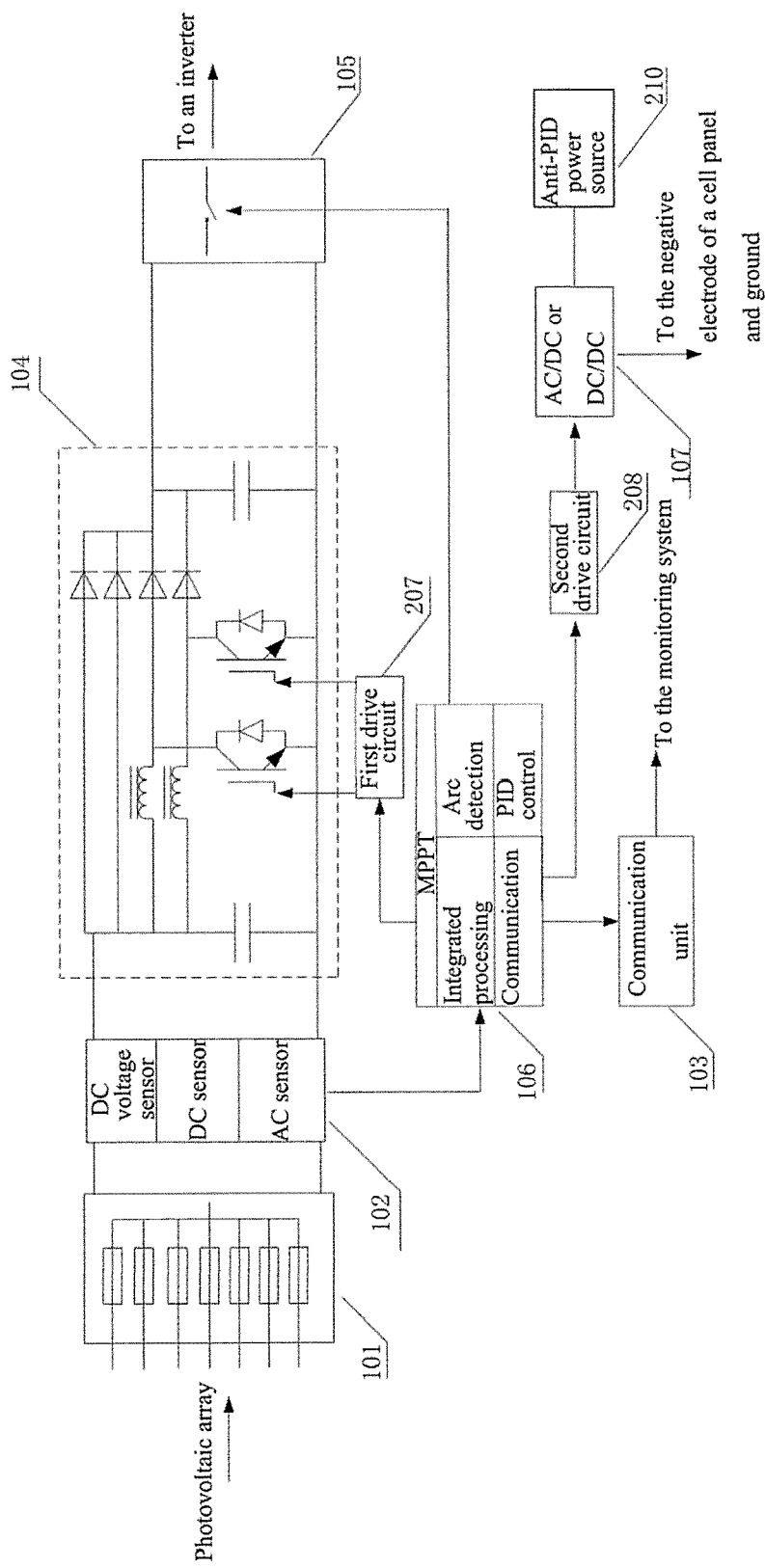
FIG. 2 is a structural diagram of the present invention in a preferred application example.

As shown in FIG. 2, in each unit module, the input collection unit 101 comprises more than two input branches connected to photovoltaic modules, and each input branch is connected in series to a fuse. That is to say, the number of the fuses corresponds to that of the input branches. The data acquisition unit 102 comprises a DC voltage sensor, a DC current sensor and an AC current sensor that are configured to acquire the voltage and current of the unit module. The boost unit 104, which is constituted by two boost circuits, and two bypass diodes that are in parallel connected with the boost circuits, is capable of achieving interleaving chopping and operating in an MPPT mode. The arc isolation unit 105 comprises a DC circuit breaker, and may receive instructions sent by the control unit 106 and then execute opening and closing. The anti-PID unit 107 is constituted by a DC/DC or AC/DC unit for generating a proper DC voltage to be applied between the negative electrode of a cell panel and ground. The anti-PID unit 107 is powered by an anti-PID power source 210 including a DC source, AC source, battery or an external power grid.

In this embodiment, the communication unit 103 is shared by a plurality of unit modules and configured to receive data information of the unit modules and upload the information for monitoring. In specific application, a communication mode for the communication unit 103 may be a wired mode, such as RS485 and Ethernet, and may also be a wireless mode, such as wifi and GPRS. The control unit 106 is also shared by a plurality of unit modules and configured to process data and send instructions to the boost units 104 and the arc isolation units 105, and keeps in communication with the communication unit 103.

In this embodiment, a first drive circuit 207 is further disposed between the control unit 106 and the boost unit 104 to directly receive instructions from the control unit 106 and then drive the boost circuits. A second drive circuit 208 is disposed between the control unit 106 and the anti-PID unit 107 to receive instructions from the control unit 106 and then drive the anti-PID unit 107 for PWM control.

Figure 3:
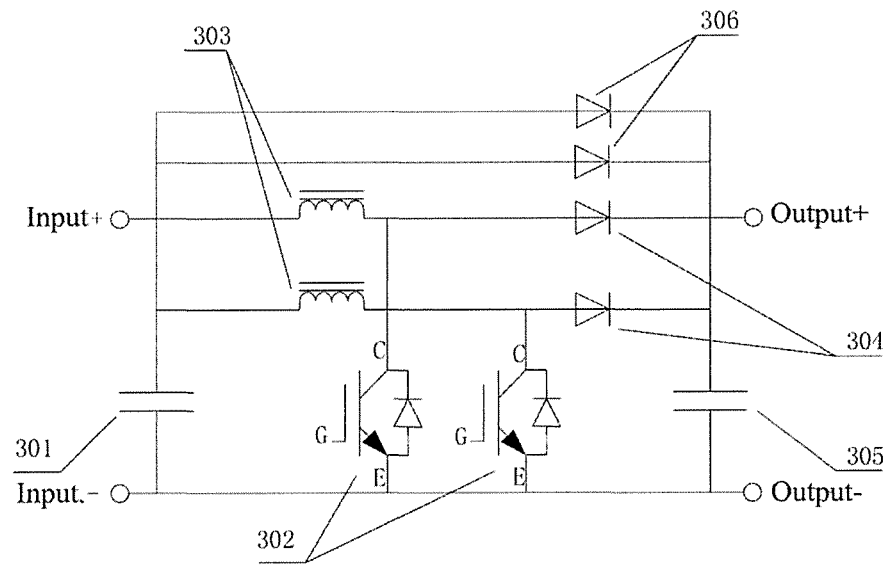
FIG. 3 is a structural diagram of a boost unit of the present invention in a preferred application example.

As shown in FIG. 3, the positive input electrode of the boost unit 104 is connected to the positive output electrode of the input collection unit 101, while the negative input electrode of the same is connected to the negative output electrode of the input collection unit 101. The boost unit 104 comprises an input capacitor 301, two IGBT modules 302 (comprising backward diodes), two inductors 303, two major circuit diodes 304, an output capacitor 305 and two bypass diodes 306, wherein the input capacitor 301 is connected between the positive and negative input electrodes to stabilize the input voltage and realize energy transfer; the output capacitor 305 is connected between the positive and negative output electrodes to stabilize the output voltage and realize filtering; the inductors 303 are connected in series with the major circuit diodes 304 and further connected in parallel with the bypass diodes 306. The two IGBT modules 302 constitute T circuits with the inductors 303 and the major circuit diodes 304, respectively. The sources of the IGBT modules 302 are connected to the anodes of the major circuit diodes 304 and the drains of the same to the negative electrode of the major circuit, respectively. Thus, double parallel boost circuits with double bypass diodes are constituted.

Figure 4:
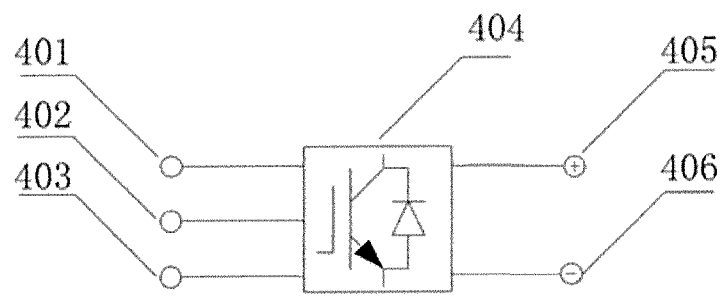
FIG. 4 is a structural diagram of an anti-PID unit of the present invention in a preferred application example.

As shown in FIG. 4, the major circuit 404 of the anti-PID unit 107 is constituted by a DC/DC or AC/DC isolating conversion unit, wherein input terminals include a first anti-PID unit input terminal 401, a second anti-PID unit input terminal 402 and a third anti-PID unit input terminal 403. If the anti-PID power source 210 is three-phase AC power, the first anti-PID unit input terminal 401 is connected to phase A of the anti-PID power source 210, while the second anti-PID unit input terminal 402 is connected to phase B of the anti-PID power source 210, and the third anti-PID unit input terminal 403 is connected to phase C of the anti-PID power source 210. If the anti-PID power source 210 is single-phase AC power, the major circuit 404 is provided with only the first anti-PID unit input terminal 401 and the second anti-PID unit input terminal 402 that are connected to two output terminals of the anti-PID power source 210, respectively. If the anti-PID power source 210 is DC power, the major circuit 404 is then provided with only the first anti-PID unit input terminal 401 and the second anti-PID unit input terminal 402, with the first anti-PID unit input terminal 401 being connected to the positive electrode of the anti-PID power source 210 and the second anti-PID unit input terminal 402 being connected to the negative terminal of the anti-PID power source 210. Depending on different types of the anti-PID power source 210, the major circuit 404 may be chosen to be isolated DC/DC or AC/DC circuit. A first output terminal 405 is connected to the negative electrode of the photovoltaic module, while a second output terminal 406 is connected to the ground.

Figure 5:
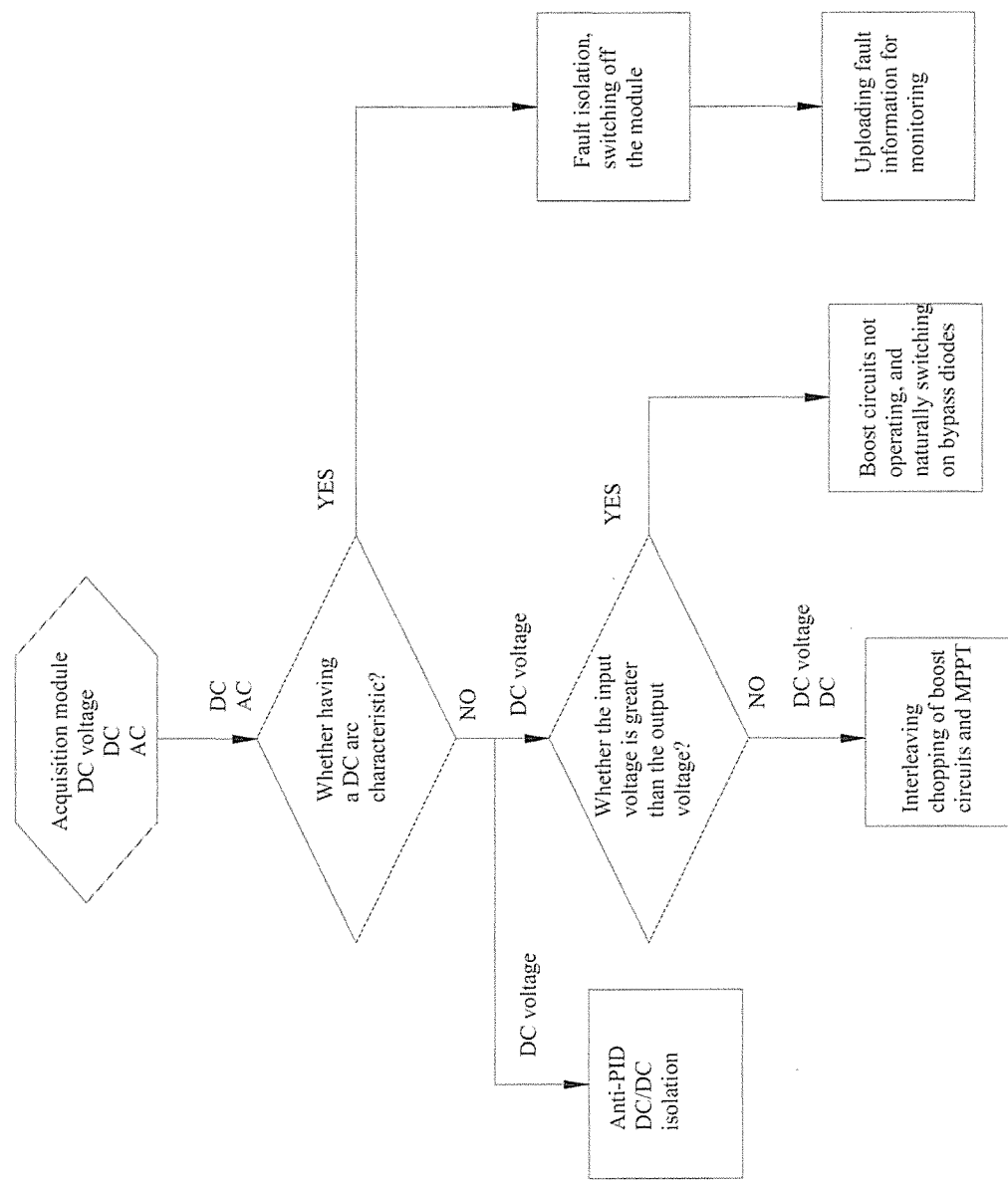
FIG. 5 is a diagram of an operating principle of the present invention in a preferred application example.

As shown in FIG. 5, the operational principle of the photovoltaic intelligent power supply in the present invention is explained as follows: due to the modular design, descriptions are only made to the operational principle of an individual unit module herein. Referring to FIG. 2, collection for a plurality of photovoltaic modules is achieved by the input collection unit 101 that is enabled to realize overcurrent and short-circuit protection with the fuses. After being collected by the input collection unit 101, relevant signals are acquired by means of the DC voltage sensor, the DC current sensor and the AC current sensor of the data acquisition unit 102 and sent to the control unit 106 to be processed, wherein DC voltage and DC current signals are used together for MPPT control, while DC and AC signals are used together to detect whether the DC side has an arc characteristic. In case of DC arching, the control unit 106 reports it to a monitoring system via the communication unit 103, and simultaneously sends a signal of switching off to the arc isolation unit 105. In this way, it may not cause shutdown of inverters, and other normal modules may work continuously. Also, the maintenance personnel can locate faults conveniently.

Referring to FIG. 3, when the input voltage is higher than the output voltage, the boost circuits in the boost unit 104 do not work, and current flows through the bypass diodes 306. When the input voltage is lower than the output voltage, the boost circuits in the boost unit operate, while the bypass diodes 306 are naturally switched off, and the control unit 106 generates interleaving chopping instructions for two boost circuits according to the requirements of MPPT. Based on the DC voltage detected by the data acquisition unit 102, the control unit 106 generates and sends an instruction to the second drive circuit 208 for DC/DC or AC/DC converter in the anti-PID unit 107 so that a corresponding DC voltage is generated and applied to the negative DC electrode and ground to compensate the negative voltage between the negative DC electrode and ground. Furthermore, the anti-PID unit 107 is powered by the anti-PID power source 210. As a result, the PID effect of the module is effectively inhibited.

The above is only the preferred embodiment of the present invention and the scope of the present invention is not limited by the above embodiments; therefore, all the technical solutions within the spirit of the present invention should be included within the scope of the present invention. It should be pointed out that this invention includes all modifications encompassed within the spirit and scope of the present invention; for one skilled in the art.

What is claimed is:

1. A photovoltaic intelligent power supply, comprising: at least one unit module, a communication unit (103) and a control unit (106), wherein the at least one unit module are connected to the control unit (106) and the communication unit (103), the at least one unit module comprises an input collection unit (101), a data acquisition unit (102), a boost unit (104), an arc isolation unit (105) and an anti-PID unit (107), wherein the input collection unit (101) is connected to a photovoltaic module, the data acquisition unit (102) is configured to acquire voltage and current state signals, the boost unit (104) is configured to perform interleaving chopping and operate in an MPPT mode, the arc isolation unit (105) is configured to receive instructions sent by the control unit (106) to execute opening and closing; and the anti-PID unit (107) is configured to receive instructions sent by the control unit (106) so as to generate proper DC voltage to be applied between the negative electrode of a cell panel and ground, wherein the boost unit (104) comprises an input capacitor (301), two IGBT modules (302) comprising backward diodes, two inductors (303), two major circuit diodes (304), an output capacitor (305) and two bypass diodes (306), wherein when the data acquisition unit (102) detects that input voltage is higher than output voltage, boost circuits in the boost unit (104) do not work, and current flows through the bypass diodes (306); and when the input voltage is lower than the output voltage, the boost circuits in the boost unit (104) work, while the bypass diodes (306) are naturally switched off, the two boost circuits are enabled to interleaving chopping output according to requirements of MPPT, wherein a second drive circuit (208) is disposed between the control unit (106) and the anti-PID unit (107) to receive instructions from the control unit (106) and then drive the anti-PID unit (107).

2. The photovoltaic intelligent power supply according to claim 1, wherein the input collection unit (101) comprises more than two input branches connected to the photovoltaic module, and each input branch is connected in series to a fuse.

3. The photovoltaic intelligent power supply according to claim 1, wherein the arc isolation unit (105) comprises a DC circuit breaker.

4. The photovoltaic intelligent power supply according to claim 1, wherein the anti-PID unit (107) is constituted by a DC/DC unit or AC/DC unit, and powered by an anti-PID power source (210).

5. The photovoltaic intelligent power supply according to claim 1, wherein a first drive circuit (207) is disposed between the control unit (106) and the boost unit (104) to directly receive instructions from the control unit (106) and then drive boost circuits.

* * * * *